United States Patent
Christner et al.

(10) Patent No.: US 9,737,853 B2
(45) Date of Patent: Aug. 22, 2017

(54) METHOD FOR DETERMINING A QUALITY OF A REDUCING AGENT SOLUTION CONTAINING AMMONIA USED TO REDUCE NITRITE OXIDE

(75) Inventors: Bernd Christner, Huelben (DE); Uwe Hofmann, Reichelsheim (DE); Tobias Peters, Gomaringen (DE)

(73) Assignee: Daimler AG, Stuttgart (DE)

(*) Notice: Subject to any disclaimer, the term of this patent is extended or adjusted under 35 U.S.C. 154(b) by 676 days.

(21) Appl. No.: 14/232,026

(22) PCT Filed: Jun. 29, 2012

(86) PCT No.: PCT/EP2012/002744
§ 371 (c)(1),
(2), (4) Date: Jan. 10, 2014

(87) PCT Pub. No.: WO2013/010625
PCT Pub. Date: Jan. 24, 2013

(65) Prior Publication Data
US 2014/0199219 A1    Jul. 17, 2014

(30) Foreign Application Priority Data
Jul. 19, 2011 (DE) .......................... 10 2011 108 019

(51) Int. Cl.
*B01D 53/94* (2006.01)
*F01N 3/20* (2006.01)
(Continued)

(52) U.S. Cl.
CPC ......... *B01D 53/9431* (2013.01); *F01N 3/208* (2013.01); *F01N 9/00* (2013.01);
(Continued)

(58) Field of Classification Search
CPC ........ F01N 3/208; F01N 9/00; F01N 2610/02; F01N 2900/1818; B01D 53/9431; Y02T 10/47; Y02T 10/24
(Continued)

(56) References Cited

U.S. PATENT DOCUMENTS

| 7,526,950 B2* | 5/2009 | Van Nieuwstadt . G01M 15/102 73/114.75 |
| 8,499,545 B2* | 8/2013 | Busch ..................... F01N 3/208 60/274 |
| 2010/0170226 A1 | 7/2010 | Prakash et al. |

FOREIGN PATENT DOCUMENTS

| DE | 10 2007 022 594 A1 | 11/2008 |
| DE | 10 2007 040 439 A1 | 3/2009 |

(Continued)

OTHER PUBLICATIONS

International Search Report with English translation dated Oct. 11, 2012 (5 pages).
(Continued)

*Primary Examiner* — Rebecca M Fritchman
(74) *Attorney, Agent, or Firm* — Crowell & Moring LLP

(57) ABSTRACT

A determination of a quality of a reducing agent solution containing ammonia used to reduce nitrogen oxides involves actuating a metering unit that delivers metered quantities of reducing agent solution into an engine's discharged exhaust gas and determining an efficiency value that is at least correlated with the efficiency of the SCR catalytic converter and comparing the efficiency value to a predefinable limit value. If an efficiency value not corresponding to proper functioning of the SCR exhaust emission control system is identified by the comparison, a switch is made to a diagnostic mode in a second method step. If a predefinable deviation of the efficiency value from a limit value is identified after expiration of the second method step time
(Continued)

Figure 1:
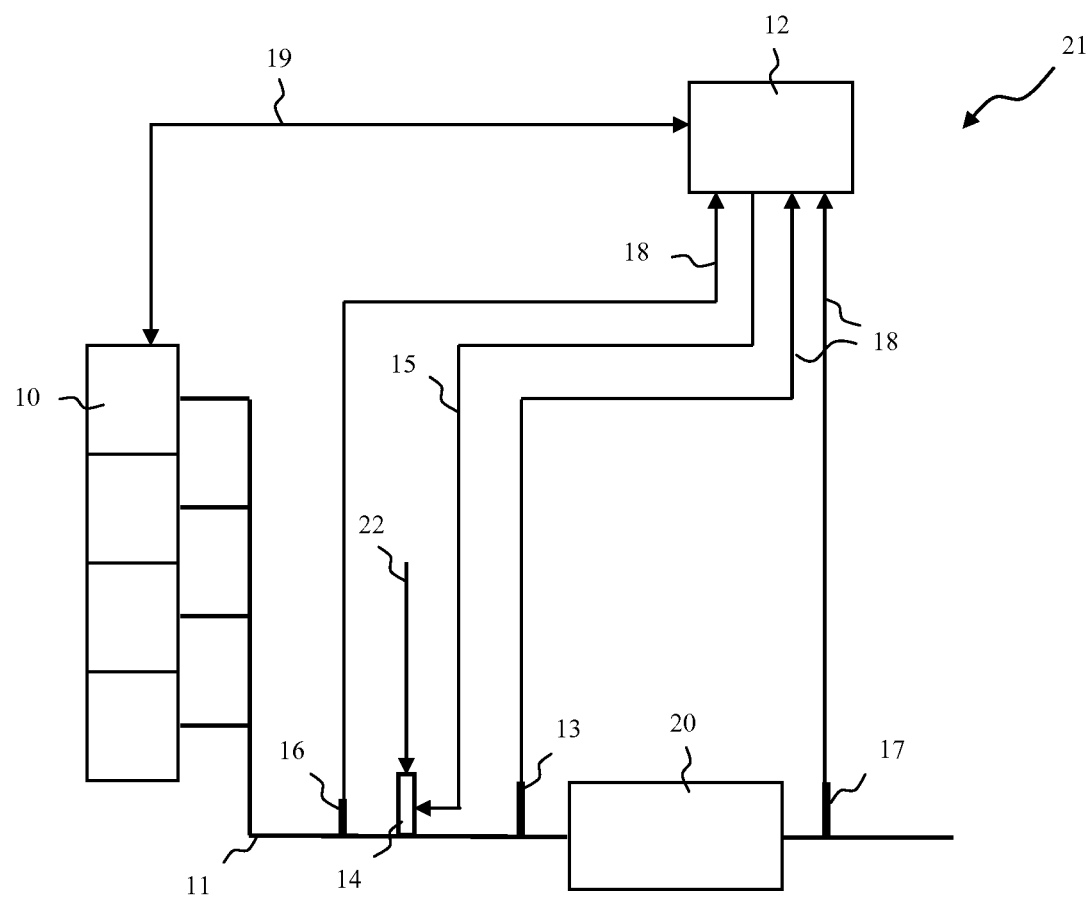

period, a third method step is performed for conditioning the SCR catalytic converter. A fourth step involves an adaptation mode in which a deviation from the efficiency value is determined.

20 Claims, 2 Drawing Sheets

(51) Int. Cl.
*F01N 9/00* (2006.01)
*B01D 53/00* (2006.01)

(52) U.S. Cl.
CPC .. *F01N 2610/02* (2013.01); *F01N 2900/1818* (2013.01); *Y02T 10/24* (2013.01); *Y02T 10/47* (2013.01)

(58) Field of Classification Search
USPC .................................................. 423/12, 212
See application file for complete search history.

(56) References Cited

FOREIGN PATENT DOCUMENTS

| | | |
|---|---|---|
| EP | 1 681 443 A1 | 7/2006 |
| EP | 1 830 040 A1 | 9/2007 |
| JP | 2008-190529 A | 8/2008 |
| JP | 2010-537117 A | 12/2010 |
| WO | WO 2009/030346 A1 | 3/2009 |
| WO | WO 2010/066546 A1 | 6/2010 |
| WO | WO 2011/078692 A1 | 6/2011 |

OTHER PUBLICATIONS

German-language Written Opinion dated Oct. 11, 2012 (5 pages).
Partial English Translation of Japanese Office Action (Three (3) pages).

* cited by examiner

METHOD FOR DETERMINING A QUALITY OF A REDUCING AGENT SOLUTION CONTAINING AMMONIA USED TO REDUCE NITRITE OXIDE

BACKGROUND AND SUMMARY OF THE INVENTION

Exemplary embodiments of the present invention are directed to a method for determining a quality of a reducing agent solution containing ammonia used for reducing nitrogen oxides. Specifically, exemplary embodiments of the present invention relate to a method for determining a quality of a reducing agent solution containing ammonia used for reducing nitrogen oxides in an SCR exhaust emission control system of an internal combustion engine.

For the catalytically assisted removal of nitrogen oxides (NOx) from internal combustion engine exhaust gas, it is known to add aqueous urea solution as a reducing agent containing ammonia ($NH_3$) to the exhaust gas of the internal combustion engine. Due to thermolysis and/or hydrolysis, $NH_3$ is released into the hot exhaust gas as the actual selective reducing agent with regard to the NOx reduction in a so-called SCR catalytic converter. This results in the problem of determining an appropriate metering quantity of the reducing agent for the intended cleaning effect, while also avoiding overmetering, which may result in undesirable $NH_3$ slip. Furthermore, by its nature the concentration of ammonia or urea in the reducing agent significantly influences the metering quantity to be set. To take this influencing variable into account, various sensor-based diagnostic methods have already been proposed for ascertaining the quality of the reducing agent solution determined by the ammonia or urea concentration, but they involve correspondingly complex hardware.

To avoid this complexity, German patent document DE 102007022594 proposes to evaluate the quality of the reducing agent solution under certain operating conditions based on ammonia slip determined downstream from the SCR catalytic converter. In general, however, it is desirable to keep the emissions of pollutants in the exhaust gas of internal combustion engines, and thus also ammonia slip, as low as possible.

Exemplary embodiments of the present invention, therefore, provide a method by means of which the most reliable assessment possible may be made of an in particular decreased quality of a reducing agent solution used for reducing nitrogen oxides, in a manner which is less complex with regard to equipment and which largely avoids harmful emissions.

In the method according to the invention for determining a quality of a reducing agent solution containing ammonia used for reducing nitrogen oxides in an SCR exhaust emission control system of an internal combustion engine, a metering unit for delivering predefinable target metering quantities of the reducing agent solution into the internal combustion engine exhaust gas is actuated, and by means of a NOx sensor situated downstream from an SCR catalytic converter of the SCR exhaust emission control system and which has a cross-sensitivity to ammonia, an efficiency value that is at least correlated with the efficiency of the SCR catalytic converter is determined and compared to a predefinable limit value. A first target metering quantity and a first limit value in a normal metering mode are provided in a first method step. In the event that an efficiency value not corresponding to proper functioning of the SCR exhaust emission control system is identified by the comparison, the normal metering mode is terminated and a switch is made to a diagnostic mode in a second method step, in which for a first time period, a second target metering quantity that is greater than the first metering quantity, and a second limit value are provided. If a predefinable deviation of the efficiency value from the second limit value is identified after the first time period has elapsed, conditioning of the SCR catalytic converter is carried out in a third method step in such a way that a quantity of ammonia stored in the SCR catalytic converter falls below a predefinable storage quantity limit value. Subsequently, in an adaptation mode as the fourth method step, a third target metering quantity and a third limit value are provided for a predefinable second time period, and if a predefinable deviation of the efficiency value from the third limit value is identified after the second time period has elapsed, a deficient quality of the reducing agent solution is diagnosed.

Urea, ammonium carbamate, ammonium formate, and/or a similar substance that is capable of splitting $NH_3$ and that is present in the form of an aqueous solution is primarily suitable as the reducing agent. The reducing agent solution may be added to the exhaust gas in pure form or as an aerosol-like mist by means of a metering unit situated upstream from the SCR catalytic converter in an appropriate exhaust gas line of the SCR exhaust emission control system. The metering unit is preferably designed in the manner of a metering valve having one or more nozzle openings. The SCR catalytic converter is preferably designed as a honeycomb structure in the form of an extruded bulk catalyst based on tungsten oxide or vanadium pentoxide, or as a coated zeolitic catalyst based on a copper- or iron-containing zeolite. It is known that these types of catalytic converters are able to store considerable quantities of $NH_3$, whereby stored $NH_3$ acts as a reactant for reduction of NOx contained in the exhaust gas. The $NH_3$ quantity stored in the SCR catalytic converter is also referred to below as an $NH_3$ filling level. The $NH_3$ filling level is preferably considered to be a relative quantity that indicates the stored $NH_3$ quantity with respect to the maximum storable $NH_3$ quantity under the instantaneous conditions.

An efficiency value that is at least correlated with the efficiency of the SCR catalytic converter is determined by means of the NOx sensor, which is situated downstream from the SCR catalytic converter and which is sensitive to NOx and $NH_3$. As the result of a comparison, which is generally and preferably continuous or repetitive and is carried out during brief time intervals, of the determined efficiency value to a predefinable limit value, in particular a predefinable first limit value in the normal metering mode, monitoring of the functioning of the SCR exhaust emission control system and in particular of the SCR catalytic converter is made possible. The efficiency value is preferably an efficiency regarding the NOx conversion capability of the SCR catalytic converter, or is represented by the signal value of the NOx sensor itself. In addition, by means of the NOx sensor, the $NH_3$ filling level of the SCR catalytic converter, which is crucial for the NOx conversion, may be monitored and used as the efficiency value. In the normal metering mode, the metering quantity of the reducing agent is continuously adjusted in such a way that the efficiency value is within a predefinable value range. An insufficient NOx conversion or undermetering of the reducing agent may be recognized by an increased NOx concentration, for example, and corrected if necessary by adjusting the metering quantity. A decreased $NH_3$ storage capacity of the SCR catalytic converter or overmetering may be recognized by an increased $NH_3$ concentration, and if necessary may likewise be corrected by adjusting the metering quantity.

If the determined efficiency value is within a predefinable range about a target value, proper functioning of the SCR exhaust emission control system may be assumed, and there is generally no need for interrupting or terminating the normal metering mode. However, if the comparison shows, in particular due to an exceedance of the first limit value, that the SCR exhaust emission control system is not functioning properly, this is treated as a malfunction, which according to the invention is further analyzed. In the case of a concentration detected by the NOx sensor as the efficiency value, the first limit value is preferably in a range between 5 ppm and 50 ppm of NOx or $NH_3$.

According to the invention, in the event that improper functioning of the SCR exhaust emission control system is identified, the normal metering mode is terminated and a switch is made to a diagnostic mode in which for a first time period, a second target metering quantity which is greater than the first metering quantity, and a second limit value are provided. The second limit value is preferably specified as a function of the increase in the target metering quantity. The signal pattern of the NOx sensor as a response to the increased target metering quantity is thus evaluated, and based on the evaluation a decision is made no later than the elapsing of the first time period as to whether the malfunction initially detected requires further diagnosis. According to the invention, if a predefinable deviation of the determined efficiency value from the second limit value is identified after the first time period has elapsed, a method step for conditioning the SCR catalytic converter is initiated and carried out. In this conditioning step, as the result of suitable metering of the reducing agent and/or a suitable NOx supply, the $NH_3$ quantity stored in the SCR catalytic converter falls below a predefinable storage quantity limit value. The storage quantity limit value is preferably selected such that slip of the reducing agent or $NH_3$ may be ruled out with sufficient certainty. An increased quantity of $NH_3$ stored in the SCR catalytic converter possibly caused by previous overmetering is thus reduced, and a well-defined state of the catalytic converter is achieved.

According to the invention, after the conditioning step an adaptation mode is provided as a further method step. In the adaptation mode, a third target metering quantity and a third limit value are provided for a predefinable second time period. If a predefinable deviation of the efficiency value from the third limit value is identified after the second time period has elapsed, a deficient quality of the reducing agent solution is diagnosed. Due to the method steps preceding the adaptation mode, it is possible to rule out with a high level of certainty other sources of error as the cause of the originally detected malfunction, and based on the deviation of the efficiency value from the third limit value, a very reliable conclusion may be drawn concerning a deficient and in particular decreased quality of the reducing agent.

In one embodiment of the invention, a control unit having a computation model, which at least partially describes the SCR exhaust emission control system, is provided so that a target metering quantity is determinable, by means of which predefinable values or value ranges of a quantity of $NH_3$ stored in the SCR catalytic converter, or an efficiency of a NOx conversion by the SCR catalytic converter, may be set in a regulated or controlled manner, and in addition limit values for the efficiency value of a properly operating SCR exhaust emission control system may be established. In particular for a normal metering mode, an adjustment is preferably made of the value of the $NH_3$ filling level in the SCR catalytic converter, which is modeled by the computation model. An $NH_3$ feed rate that results from the set metering quantity and a modeled $NH_3$ consumption rate due to the reaction with NOx and oxygen and/or slip are preferably balanced by continuous integration, and the metering quantity is set in such a way that that an intended $NH_3$ filling level in the catalytic converter, and thus an intended catalytic converter efficiency, are at least approximately achieved. In particular, in the event of decreased $NH_3$ storage capacity of the SCR catalytic converter due to high catalytic converter temperatures, a switch to model-based efficiency control for achieving a catalytic converter target efficiency that is predefinable by the computation model may be provided. In any event, it is possible to determine or establish limit values for the efficiency value of a properly operating SCR exhaust emission control system by a linkage, carried out by the computation model, of measured values of instantaneous operating variables such as temperature, exhaust gas throughput, etc., and stored characteristic values in particular of the SCR catalytic converter. This achieves reliable error recognition and improved analysis of a detected error.

In another embodiment of the method, in the diagnostic mode a second target metering quantity is set, which is greater than the first target metering quantity by a factor of 1.1 to 5. This allows a brief first time period, and thus, despite the overmetering, also a low emission value of $NH_3$ slip that may occur. Due to the $NH_3$ overmetering in the diagnostic mode, the signal of the NOx sensor may be unambiguously interpreted despite the cross-sensitivity of the NOx sensor situated downstream from the SCR catalytic converter.

In another embodiment of the method, the first time period is selected as a function of the second target metering quantity in such a way that a quantity of $NH_3$ metered with the reducing agent solution over the first time period corresponds to a quantity of $NH_3$ that is storable in an SCR catalytic converter under the prevailing conditions with an $NH_3$ storage capacity that is decreased to a tolerance limit. Accordingly, for establishing the first time period, a marginally aged SCR catalytic converter having an impaired $NH_3$ storage capacity due to aging is assumed. For an impermissibly excessively aged SCR catalytic converter, the quantity of $NH_3$ supplied with the reducing agent in the first time period would therefore result, at best, in noticeable or detectable $NH_3$ slip. Due to establishing the first time period according to the invention, undesirable additional pollutant emissions in the diagnostic mode are avoided in a particularly reliable manner and catalyst aging is detectable.

In another embodiment of the method, for the conditioning, a target metering quantity that is less than the first target metering quantity or reduced to zero and/or an uncontrolled NOx emission, which is increased compared to normal internal combustion engine operation, is/are set. This allows particularly rapid reduction of a quantity of stored $NH_3$ in the SCR catalytic converter which is increased due to the previous $NH_3$ overmetering. On the other hand, a defined loading state for the SCR catalytic converter is achieved after conclusion of the third method step.

A further improvement in the reproducibility with regard to the provided conditioning of the SCR catalytic converter may be achieved when, in another embodiment of the method, the conditions for the conditioning are maintained until a quantity of $NH_3$ stored in the SCR catalytic converter has fallen below a threshold value that is crucial for $NH_3$ slip due to a reaction of NOx contained in the SCR catalytic converter with exhaust gas in the internal combustion engine.

In another embodiment of the method, an adaptable correction value that corrects the metering quantity is provided for the controlled or regulated setting of the quantity of $NH_3$ stored in the SCR catalytic converter or of the efficiency of the SCR catalytic converter as a result of the metering quantity determined by the computation model. Thus, according to the invention the option is provided of making a correction that acts directly on the modeled metering quantity. Interfering influences, for example gradually progressive aging or drift effects, may thus be compensated for. In particular, compensation for interfering influences that may not be taken into account or that may be only insufficiently taken into account by the computation model is made possible. In this regard, it is particularly advantageous when, in another embodiment of the method, in the adaptation mode a controlled setting of the metering quantity for a predefinable target efficiency of the SCR catalytic converter and a determination of the actual efficiency of the SCR catalytic converter are carried out, and in addition a value of the correction value is determined that is or would be necessary for a predefinable approximation of the actual efficiency to the target efficiency, and subsequently a deficient quality of the reducing agent solution is diagnosed when the determined correction value is outside a predefinable target range. In this case, adaptation of the computation model by changing the correction value is not possible, or is possible only under unacceptable limitations. In particular, for a catalytic converter activity that is originally impermissibly decreased, an appropriately large, necessary change in the correction value in conjunction with the other information determined in the method according to the invention may be declared plausible only due to an impermissibly decreased quality in the reducing agent.

Advantageous embodiments of the invention are illustrated in the drawings and described below. The features stated above and to be explained below may be used not only in the particular stated feature combination, but also in other combinations or alone without departing from the scope of the present invention.

BRIEF DESCRIPTION OF THE DRAWING FIGURES

Figure 2A:
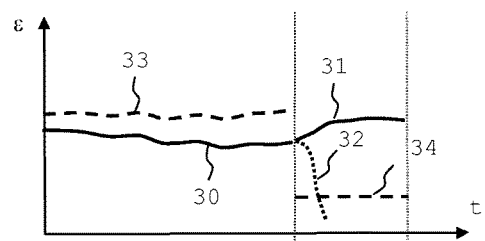
Figure 2B:
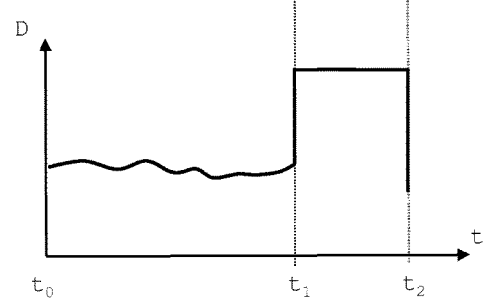

The figures show the following:

FIG. 1 shows a schematic block diagram of a vehicle internal combustion engine having a connected exhaust emission control system; and FIGS. 2a and 2b show time diagrams for examples of curves of an efficiency value (FIG. 2a) and of a specified target metering quantity of reducing agent (FIG. 2b).

DETAILED DESCRIPTION

FIG. 1 shows by way of example a schematic block diagram of an internal combustion engine 10 that is preferably designed as a diesel engine, having an associated SCR exhaust emission control system 21. The exhaust gas discharged from the internal combustion engine 10 is received by an exhaust gas line 11 and flows through an SCR catalytic converter 20. On the input side of the SCR catalytic converter 20, a temperature sensor 13 for measuring the exhaust gas temperature is situated in the exhaust gas line 11, and situated further upstream from the temperature sensor 13 is a metering unit 14 for delivering a reducing agent solution containing ammonia into the exhaust gas. An aqueous urea solution having a specified urea concentration of approximately 32 mass percent is preferably used.

Depending on the operating conditions and the design of the SCR catalytic converter 20, the ammonia contained in the reducing agent is stored to a greater or lesser extent in the SCR catalytic converter 20, and reacts there in a selective catalyst reaction with NOx contained in the exhaust gas to form nontoxic products. The reducing agent solution is supplied to the metering unit 14 via a line 22 from a container, not illustrated. NOx sensors 16 and 17 are situated in the exhaust gas line 11, upstream from the metering unit 14 and on the output side of the SCR catalytic converter 20. In particular, the NOx sensor 17 is designed in such a way that it may emit a signal correlated with the NOx concentration and also with the $NH_3$ concentration of the exhaust gas. The NOx sensors 16, 17 as well as the temperature sensor 13 are connected to a control unit 12 via signal lines 18. The control unit 12 is also connected to the metering unit 14 via a control line 15, and is connected to the internal combustion engine 10 via a bidirectional signal line 19. The metering unit 14 for delivering a metering quantity of the reducing agent solution specified by the control unit 12 is actuated via the control line 15.

The control unit 12 communicates with the internal combustion engine 10 via the signal line 19, and on the one hand may receive information concerning the operating variables of the internal combustion engine, such as a delivered torque or a rotational speed, and on the other hand may set operating variables of the internal combustion engine 10 as needed. The control unit 12 has a computing and memory unit, not illustrated, and may perform complex control and regulation tasks for operating the internal combustion engine 10 and the SCR exhaust emission control system 21 by processing the received signals and accessing stored characteristic maps. In particular, a computation model that at least partially describes the SCR exhaust emission control system 21 is provided, by means of which operating variables of the SCR exhaust emission control system 21 may be detected, processed, and set in a regulated or controlled manner.

It is understood that further components, not illustrated, may be situated in the exhaust gas line 11, such as an additional oxidation catalytic converter or a particle filter, which may be installed in the exhaust gas line 11 downstream or upstream from the SCR catalytic converter 20. In addition, further sensors for exhaust gas components or operating variables may be situated in the exhaust gas line 11 and connected to the control unit 12 for improving the control and regulation behavior.

Preferred procedures for carrying out the method according to the invention are explained in greater detail below with reference to the time diagrams illustrated in FIGS. 2a and 2b. Examples of time curves of an efficiency value of the SCR exhaust emission control system 21 are in FIG. 2a, and a parallel curve of a target metering quantity D, which has been determined by a computation model program running in the control unit 12 and for delivery of which the metering unit 14 has been actuated, is in FIG. 2.

A normal metering mode proceeds in a time range $t_0 < t < t_1$. Model-based $NH_3$ filling level regulation or model-based efficiency control is preferably carried out in this normal metering mode. In the model-based $NH_3$ filling level regulation, a model-based value of the $NH_3$ filling level of the SCR catalytic converter 20 is adjusted to a predefinable target value by feedback control, and a target metering quantity necessary for this purpose is determined, for delivery of which the metering unit 14 is actuated. In the model-based efficiency control, feed-forward control is carried out in which the metering unit 14 is actuated for delivering a target metering quantity D required according to the computation model in order to achieve a predefinable target efficiency of the SCR catalytic converter 20 with regard to its NOx conversion. In both cases, an efficiency $\epsilon$ of the SCR catalytic converter 20 results for the monitored SCR exhaust emission control system 21 and whose course is depicted by way of example in FIG. 2a by a line denoted by reference numeral 30. In the present case, the efficiency $\epsilon$ of the SCR catalytic converter 20 is computed based on NOx and $NH_3$ concentration values K1 and K2, respectively, determined from signals of the NOx sensors 16 and 17, according to the formula $$\epsilon = 1 - K2/K1 \qquad (1),$$

and is considered to be crucial for the functioning of the SCR exhaust emission control system 21. Instead of the NOx concentration obtained by measurement using the NOx sensor 16 situated upstream from the SCR catalytic converter 20, a NOx concentration that is read out from a characteristic map corresponding to the prevailing operating conditions of the internal combustion engines may also be used.

For evaluating the exhaust emission control system 21 with regard to its proper functioning, the determined efficiency $\epsilon$ is compared to a target efficiency $\epsilon_{target}$ corresponding to the $NH_3$ filling level that is adjusted during model-based $NH_3$ filling level regulation or corresponding to the set target metering quantity D that is controlled during the efficiency control. An example of the course of the target efficiency $\epsilon_{target}$ is illustrated by the dashed line 33 in FIG. 2a. Improper functioning is considered to be present, for example, when the determined efficiency $\epsilon$ deviates from the target efficiency $\epsilon_{target}$ by more than a predefinable extent over the entirety or the major portion of the interval length $t_0 < t < t_1$. A preferred evaluation criterion is defined according to the formula $$|\int (\epsilon_{target} - \epsilon) * dt| < \delta \qquad (2),$$

in which deviations between the target efficiency $\epsilon_{target}$ and the efficiency $\epsilon$ are integrated over the interval length $t_0$ to $t_1$, and the absolute value is compared to a predefinable limit value $\delta$. The interval length is preferably established based on a predefinable cumulative value of an uncontrolled NOx emission from the internal combustion engine 10 or a cumulative value of a NOx concentration supplied by the NOx sensor 16, or is defined by a fixed time period. It is preferably provided to continuously line up corresponding integration intervals one after the other and thus continuously monitor the SCR exhaust emission control system 21. If the limit value $\delta$ is exceeded and therefore the inequality (2) is not satisfied, improper functioning is diagnosed. It is understood that other suitable efficiency values may also be evaluated, and/or conditions for assessing proper functioning of the exhaust emission control system 12, such as for further improved statistical validation, may be additionally provided.

If improper functioning of the SCR exhaust emission control system 21 is identified, the normal metering mode is terminated and a switch is made to a diagnostic mode in which the metering unit 14 is actuated for delivering a target metering quantity D that is increased compared to the normal metering mode. This is illustrated by the abrupt rise in the target metering quantity D at point in time $t_1$ in the diagram in FIG. 2b. At the same time as the increase in the target metering quantity D, a new, second value of the target efficiency $\epsilon_{target}$ is established. This value is illustrated in the diagram in FIG. 2a by the curve branch denoted by reference numeral 34, and as a function of the metering quantity D is selected to be much smaller in the diagnostic mode than in the normal metering mode. For overmetering, which in the diagnostic mode is typically set to be 2 to 5 times higher, the limit value for the efficiency value, which in the present case is represented by the target efficiency $\epsilon_{target}$, is negative according to formula (1). For the conditions of the diagnostic mode, a time interval $t_1 < t < t_2$ having a predefinable maximum duration is provided. This maximum duration is preferably selected in such a way that that the metered $NH_3$ quantity at least corresponds to a quantity of $NH_3$ that is storable in an SCR catalytic converter 20 under the prevailing conditions with an $NH_3$ storage capacity that is decreased to a tolerance limit.

With regard to the second limit value of the efficiency value that is established in the diagnostic mode as a response to the overmetering, two different and mutually exclusive results are possible. In the first case, the determined efficiency value falls below the second limit value within the time interval $t_1 < t < t_2$, and in the second case this result does not occur; i.e., the determined efficiency $\epsilon$ is above the second limit value, even after the time interval has elapsed. For the further procedure, initially this second case is considered below.

When, as assumed in the present case, the efficiency $\epsilon$ determined in the diagnostic mode does not fall below the second limit value within the time interval $t_1 < t < t_2$, it is assumed that actuating the metering unit 14 for delivering the increased target metering quantity D has not led to the expected result of a correspondingly increased concentration of $NH_3$ which is measurable downstream from the SCR catalytic converter 20. Consequently, there is already an increased probability that an $NH_3$ quantity corresponding to the predefined target metering quantity D of the reducing agent solution has not been supplied to the SCR catalytic converter 20, since the reducing agent solution has an impermissibly decreased content of $NH_3$, and therefore impermissibly decreased quality. In order to verify this situation at this point in time when the circumstances are still subject to uncertainty, it is preferably provided to optionally carry out conditioning of the SCR catalytic converter 20 after the time interval $t_1 < t < t_2$ has elapsed. At least the failure of the efficiency $\epsilon$, determined according to formula (2), to drop below the second limit value predefined in the diagnostic phase is provided as a necessary trigger criterion for the transition into the conditioning phase. In addition, one or more additional conditions may be provided that likewise must be met for a transition into the conditioning phase. These conditions may include, for example, the presence of a predefinable target temperature range for the SCR catalytic converter 20.

In the conditioning phase, conditions are set in such a way that a quantity of $NH_3$ supplied by computation in the diagnostic mode to the SCR catalytic converter 20 and stored therein is decreased by reaction with NOx contained in the supplied exhaust gas to the extent that it falls below a predefinable $NH_3$ storage quantity limit value which in particular is crucial for $NH_3$ slip. For this purpose, a target metering quantity D that is less than the first target metering quantity D or reduced to zero and/or an uncontrolled NOx emission that is increased compared to normal internal combustion engine operation is/are preferably set. It is particularly preferred to carry out model-based, efficiency-controlled metering of the reducing agent solution, in which a target metering quantity D determined by the computation model is specified in such a way that a predefinable target efficiency $\epsilon_{target}$ of the SCR catalytic converter 20 may be expected. At the same time, the internal combustion engine operation is preferably adapted in such a way that an increase in uncontrolled NOx emissions results, which may be achieved, for example, by changing an exhaust gas recirculation rate. It is preferred to set an increase in the uncontrolled NOx emissions by a factor of 1.1 to 5 compared to uncontrolled NOx emissions resulting from normal internal combustion engine operation. The duration of the conditioning phase is preferably established by the computation model as a function of the uncontrolled NOx emissions and the set target metering quantity D, so that the $NH_3$ filling level falls below a threshold value for the $NH_3$ filling level of the SCR catalytic converter 20 which is crucial for $NH_3$ slip due to a reaction of stored $NH_3$ with supplied NOx.

After conditioning of the SCR catalytic converter 20 has concluded, a switch is made into an adaptation mode for a predefinable second time period. Upon entry into the adaptation mode, the emissions of the increased NOx quantity are terminated by a return to normal internal combustion engine operation, and efficiency-controlled metering of the reducing agent solution is preferably carried out. The computation model specifies a target efficiency $\epsilon_{target}$ for a functional SCR catalytic converter 20, and the metering unit 14 is actuated for delivering the target metering quantity D determined by the computation model as necessary for this target efficiency $\epsilon_{target}$. At the same time, the efficiency $\epsilon$ of the SCR catalytic converter 20 is determined, preferably based on an evaluation of formula (1), and is compared to the target efficiency $\epsilon_{target}$. If the determined efficiency $\epsilon$ deviates from the target efficiency $\epsilon_{target}$ by more than a predefinable extent, a deficient, in particular decreased, quality of the reducing agent solution is diagnosed and an appropriate message is output.

In one particularly preferred method variant, an adaptable correction value F is provided for the computation model for the controlled or regulated setting of the target metering quantity D, by means of which the target metering quantity D determined by the computation model is multiplicatively or additively corrected. This correction value is preferably determined in the adaptation mode according to the formula $$F=\epsilon_{target}/\epsilon \qquad (3)$$

or the formula $$\epsilon=\epsilon_{target}+/-F \qquad (4).$$

This allows adaptation of the computation model to compensate for drift effects and inaccuracies that are not otherwise captured. If it is determined that the correction value F is outside predefinable limits, a deficient quality of the reducing agent solution is diagnosed.

In addition to determining a deficient quality of the reducing agent solution, further diagnostic results may advantageously be determined using the method according to the invention. For further explanation, reference is made once again to FIG. 2a. Namely, if it is determined in the diagnostic mode that the efficiency $\epsilon$ falls below the second limit value for the target efficiency $\epsilon_{target}$ within the time interval $t_0<t<t_1$, corresponding to the curve branch 32 illustrated by a dotted line, it may be assumed that overmetering has already occurred in the previous normal metering mode; i.e., the SCR catalytic converter 20 has not been able to process the metered $NH_3$ quantity. This is to be interpreted as increased $NH_3$ slip that triggers the error, and which further intensifies for the increased target metering quantity D which is set in the diagnostic mode. Possible reasons are an actual impermissibly increased metering quantity in the normal metering mode, or an impermissibly aged SCR catalytic converter 20 having correspondingly decreased $NH_3$ storage capacity.

For further verification, if the value falls below the predefinable second limit value it is preferably provided to immediately terminate the diagnostic mode and carry out conditioning of the SCR catalytic converter 20 analogously to the above-described procedure. If it is determined in a subsequent filling level-regulated or efficiency-controlled metering mode that the efficiency value does not meet predefinable conditions corresponding to a properly operating SCR exhaust emission control system 21, in particular that the catalytic converter efficiency $\epsilon$ has fallen below a corresponding predefined limit, an impermissibly aged SCR catalytic converter 20 is deduced and an appropriate warning message is output. On the other hand, if the efficiency limit has been reached or exceeded, the SCR catalytic converter 20 is considered to be operating properly and is switched into an adaptation mode analogously to the above-described procedure. A determined correction value F for the target metering quantity D is preferably taken over by the computation model, and the further metering is carried out using the updated correction value F.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method for determining a quality of a reducing agent solution containing ammonia used to reduce nitrogen oxides in an SCR exhaust emission control system of an internal combustion engine, the method comprising:
   a first method step that is a normal metering mode, which comprises
      actuating a metering unit to deliver a first target metering quantity of the reducing agent solution into exhaust gas of the internal combustion engine exhaust gas;
      determining, using a NOx sensor situated downstream from an SCR catalytic converter of the SCR exhaust emission control system and which has a cross-sensitivity to ammonia, a first efficiency value that is at least correlated with the efficiency of the SCR catalytic converter;
      comparing the determined efficiency value to a first limit value;
   wherein when the comparison indicates that the SCR exhaust emission control system is not functioning properly, the normal metering mode is terminated and a switch is made to a diagnostic mode in a second method step, wherein the second method step involves actuating the metering unit to deliver a second target metering quantity of reducing agent solution, which is greater than the first metering quantity, for a first time period, determining a second efficiency value, and comparing the determined second efficiency value with a second limit value;
   wherein when, after the first time period has elapsed, the comparison of the second efficiency value to the second limit value indicates a deviation of the second efficiency value and the second limit value, a third method step is performed in which the SCR catalytic converter is conditioned in such a way that a quantity of ammonia stored in the SCR catalytic converter falls below a predefined storage quantity limit value, and wherein an adaptation mode is switched to in a fourth method step, wherein the fourth method step involves actuating the metering unit to deliver a third target metering quantity of reducing agent solution for a second predefined period of time, determining a third efficiency value, and comparing the third efficiency value with a third limit value, wherein if the comparison of the third efficiency value and third limit value indicates a deviation of the third efficiency value and the third limit value, it is determined that there is a deficient quality reducing agent solution.

2. The method according to claim 1, wherein a target metering quantity is determined using a control unit having a computation model that at least partially describes the SCR exhaust emission control system, wherein the based on the determined target metering quantity predefined values or value ranges of a quantity of ammonia stored in the SCR catalytic converter, or an efficiency of a NOx conversion by the SCR catalytic converter, may be set in a regulated or controlled manner, and limit values for the efficiency value of a properly operating SCR exhaust emission control system may be established.

3. The method according to claim 1, in the diagnostic mode the second target metering quantity is greater than the first target metering quantity by a factor of 1.1 to 5.

4. The method according to claim 2, in the diagnostic mode the second target metering quantity is greater than the first target metering quantity by a factor of 1.1 to 5.

5. The method according to claim 1, wherein the first time period is selected as a function of the second target metering quantity in such a way that a quantity of ammonia metered with the reducing agent solution over the first time period corresponds to a quantity of ammonia that is storable in an SCR catalytic converter under the prevailing conditions with an ammonia storage capacity that is decreased to a tolerance limit.

6. The method according to claim 4, wherein the first time period is selected as a function of the second target metering quantity in such a way that a quantity of ammonia metered with the reducing agent solution over the first time period corresponds to a quantity of ammonia that is storable in an SCR catalytic converter under the prevailing conditions with an ammonia storage capacity that is decreased to a tolerance limit.

7. The method according to claim 1, wherein for the conditioning of the SCR catalytic converter in the third method step a target metering quantity is set that is less than the first target metering quantity or reduced to zero, or an uncontrolled NOx emission is set that is increased compared to normal internal combustion engine operation.

8. The method according to claim 2, wherein for the conditioning of the SCR catalytic converter in the third method step a target metering quantity is set that is less than the first target metering quantity or reduced to zero, or an uncontrolled NOx emission is set that is increased compared to normal internal combustion engine operation.

9. The method according to claim 4, wherein for the conditioning of the SCR catalytic converter in the third method step a target metering quantity is set that is less than the first target metering quantity or reduced to zero, or an uncontrolled NOx emission is set that is increased compared to normal internal combustion engine operation.

10. The method according to claim 6, wherein for the conditioning of the SCR catalytic converter in the third method step a target metering quantity is set that is less than the first target metering quantity or reduced to zero, or an uncontrolled NOx emission is set that is increased compared to normal internal combustion engine operation.

11. The method according to claim 1, wherein conditions for the conditioning of the SCR catalytic converter in the third method step are maintained until a quantity of ammonia stored in the SCR catalytic converter has fallen below a threshold value that is critical for ammonia slip due to a reaction of NOx contained in the SCR catalytic converter with internal combustion engine exhaust gas.

12. The method according to claim 2, wherein conditions for the conditioning of the SCR catalytic converter in the third method step are maintained until a quantity of ammonia stored in the SCR catalytic converter has fallen below a threshold value that is critical for ammonia slip due to a reaction of NOx contained in the SCR catalytic converter with internal combustion engine exhaust gas.

13. The method according to claim 4, wherein conditions for the conditioning of the SCR catalytic converter in the third method step are maintained until a quantity of ammonia stored in the SCR catalytic converter has fallen below a threshold value that is critical for ammonia slip due to a reaction of NOx contained in the SCR catalytic converter with internal combustion engine exhaust gas.

14. The method according to claim 6, wherein conditions for the conditioning of the SCR catalytic converter in the third method step are maintained until a quantity of ammonia stored in the SCR catalytic converter has fallen below a threshold value that is critical for ammonia slip due to a reaction of NOx contained in the SCR catalytic converter with internal combustion engine exhaust gas.

15. The method according to claim 2, wherein an adaptable correction value that corrects the target metering quantity is provided for the controlled or regulated setting of the quantity of ammonia stored in the SCR catalytic converter in the third method step, or the efficiency of the SCR catalytic converter as a result of the target metering quantity determined by the computation model.

16. The method according to claim 4, wherein an adaptable correction value that corrects the target metering quantity is provided for the controlled or regulated setting of the quantity of ammonia stored in the SCR catalytic converter in the third method step, or the efficiency of the SCR catalytic converter as a result of the target metering quantity determined by the computation model.

17. The method according to claim 6, wherein an adaptable correction value that corrects the target metering quantity is provided for the controlled or regulated setting of the quantity of ammonia stored in the SCR catalytic converter in the third method step, or the efficiency of the SCR catalytic converter as a result of the target metering quantity determined by the computation model.

18. The method according to claim 15, wherein in the adaptation mode
- the third target meter quantity is selected to achieve a predefined target efficiency of the SCR catalytic converter,
- a value of the correction value is determined which is or would be necessary for a predefined approximation of the efficiency to the target efficiency, and
- a deficient quality of the reducing agent solution is determined when the determined correction value is outside a predefined target range.

19. The method according to claim 16, wherein in the adaptation mode
- the third target meter quantity is selected to achieve a predefined target efficiency of the SCR catalytic converter,
- a value of the correction value is determined which is or would be necessary for a predefined approximation of the efficiency to the target efficiency, and
- a deficient quality of the reducing agent solution is determined when the determined correction value is outside a predefined target range.

20. The method according to claim 17, wherein in the adaptation mode
- the third target meter quantity is selected to achieve a predefined target efficiency of the SCR catalytic converter,
- a value of the correction value is determined which is or would be necessary for a predefined approximation of the efficiency to the target efficiency, and
- a deficient quality of the reducing agent solution is determined when the determined correction value is outside a predefined target range.

* * * * *